May 21, 1935. W. J. CAMPBELL 2,001,769
SLICING MACHINE
Filed Feb. 14, 1931 4 Sheets-Sheet 2
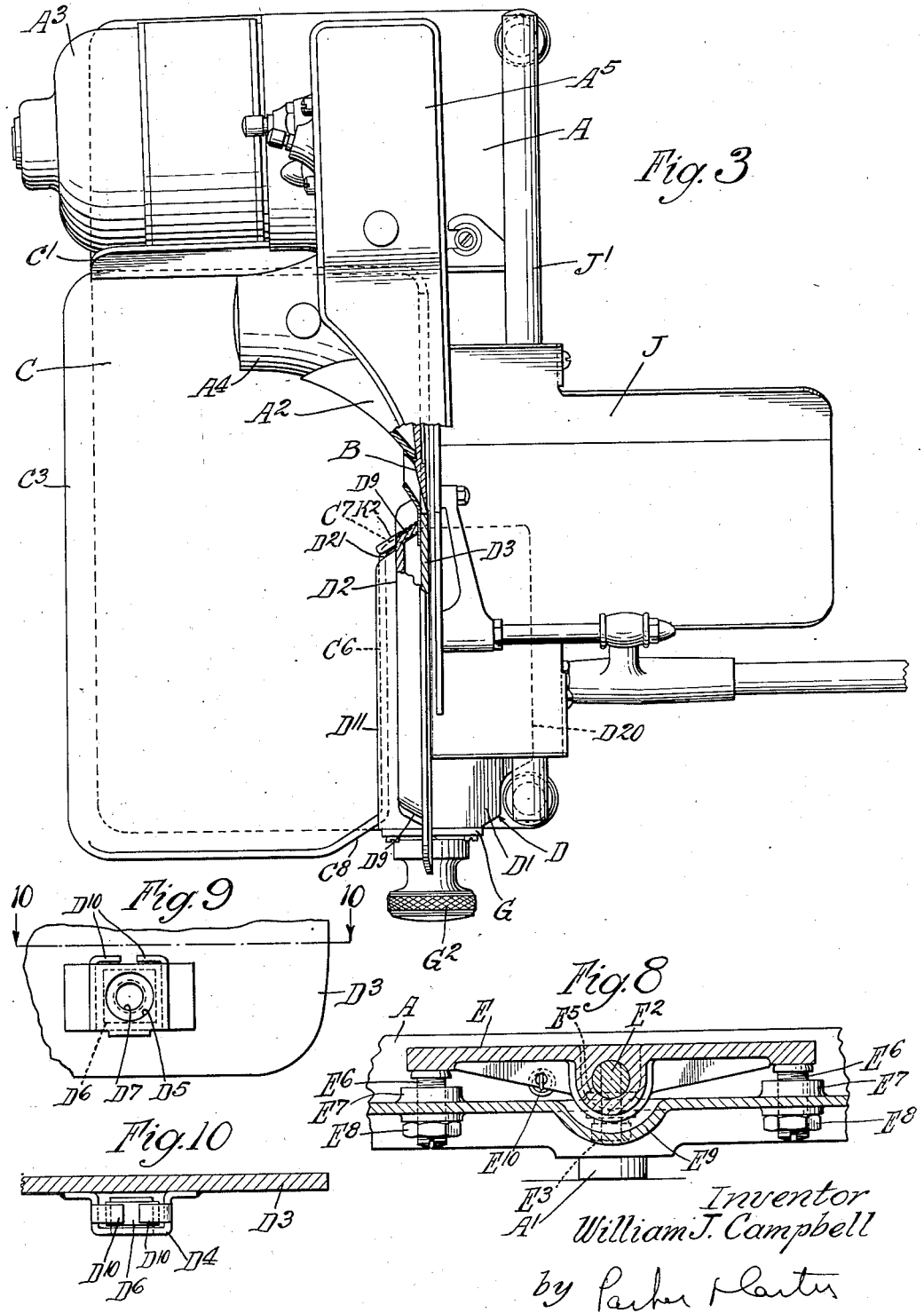

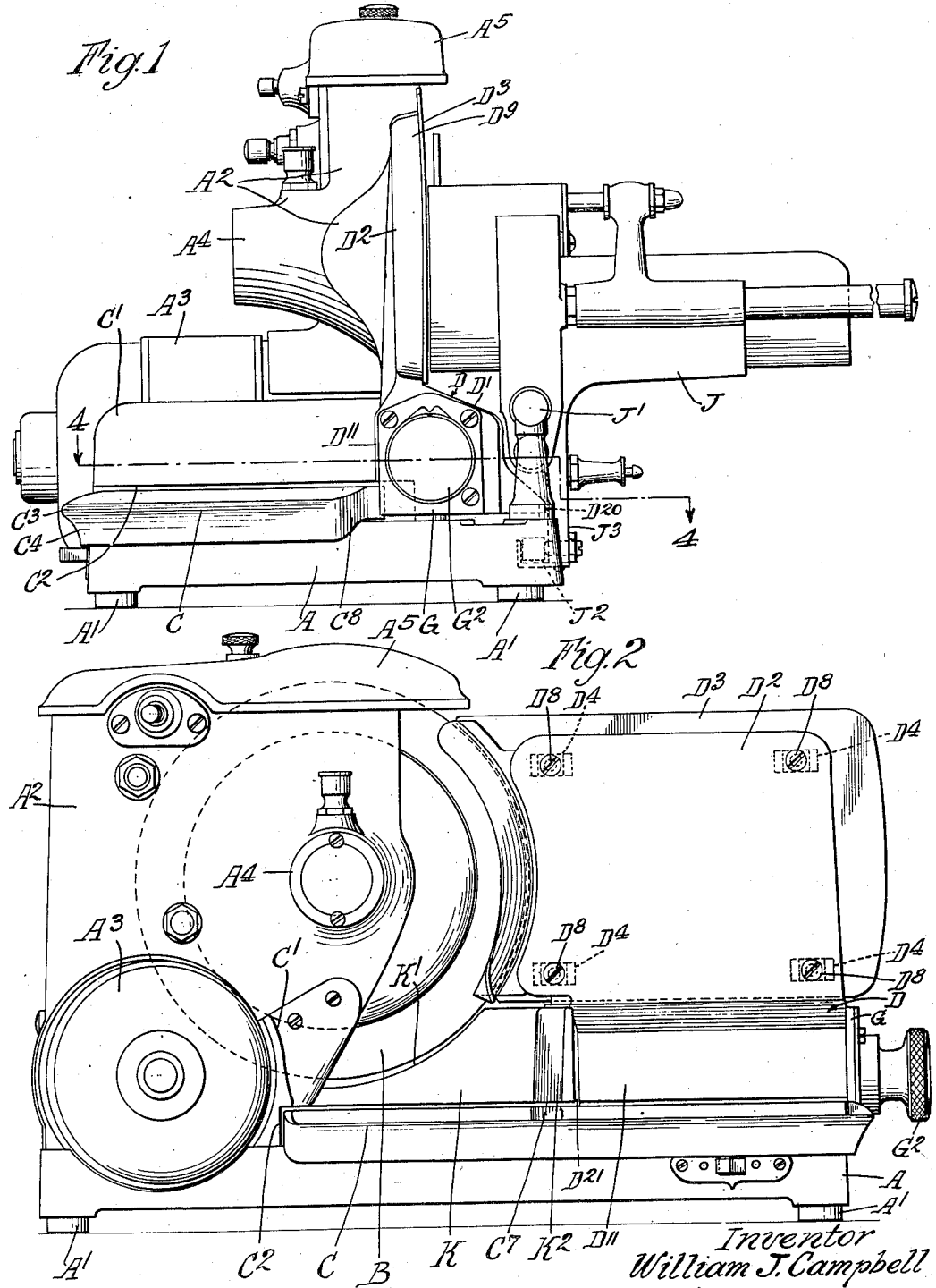

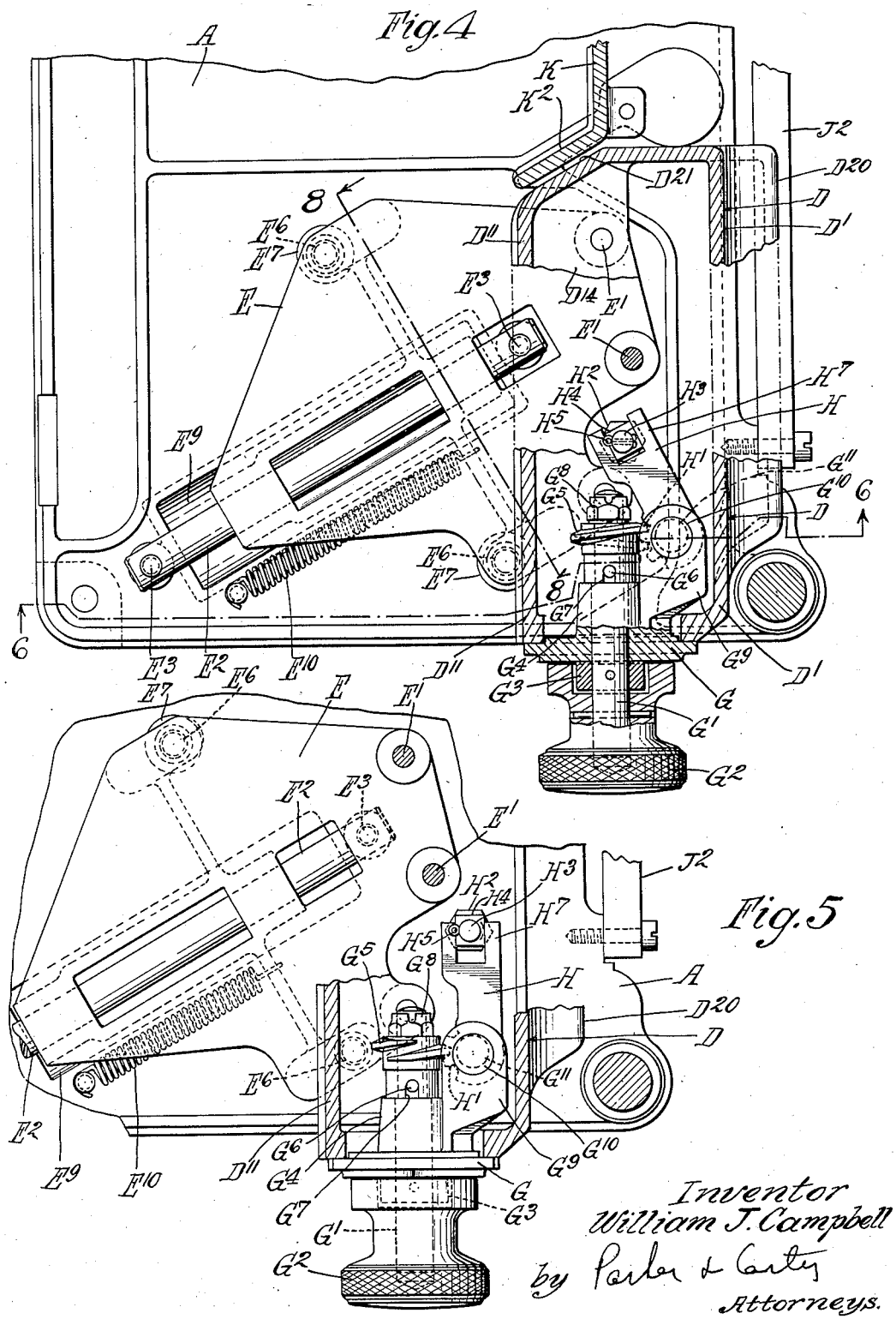

May 21, 1935.  W. J. CAMPBELL  2,001,769
SLICING MACHINE
Filed Feb. 14, 1931  4 Sheets-Sheet 4

Inventor
William J. Campbell
by Parker & Carter
Attorneys.

Patented May 21, 1935

2,001,769

UNITED STATES PATENT OFFICE 2,001,769

SLICING MACHINE

William J. Campbell, Indianapolis, Ind., assignor to American Slicing Machine Company, Chicago, Ill., a corporation of New York Application February 14, 1931, Serial No. 515,689

2 Claims. (Cl. 146—102)

My invention relates to an improvement in slicing machines of the type in which a rotary knife is associated with the gauge plate and a manually operable carriage for conveying the work across the gauge plate and knife. One object is the provision of a gauge plate and support therefor and actuating means for the gauge plate, which shall move unitarily forwardly or rearwardly together when a change of adjustment is made of the gauge plate. Another object is the provision of an improved relationship between gauge plate and gauge plate support and slice receiving tray. Another object is the provision of improved means for supporting the gauge plate upon the gauge plate support. Other objects will appear from time to time in the course of the specification and claims.

I illustrate my invention more or less diagrammatically in the accompanying drawings, wherein—

Figure 6:
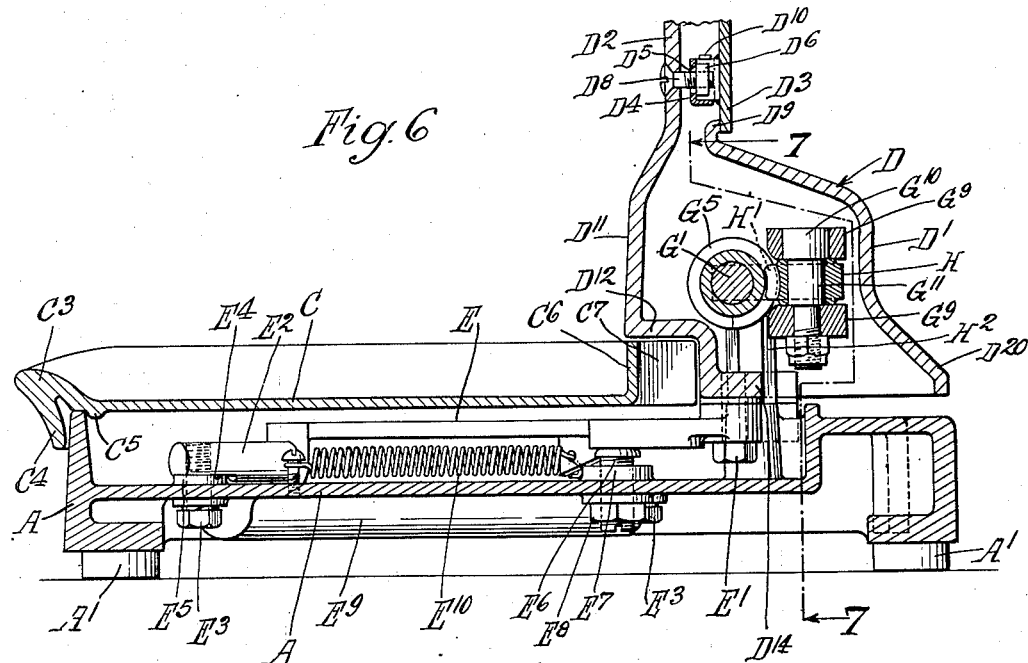
Figure 7:
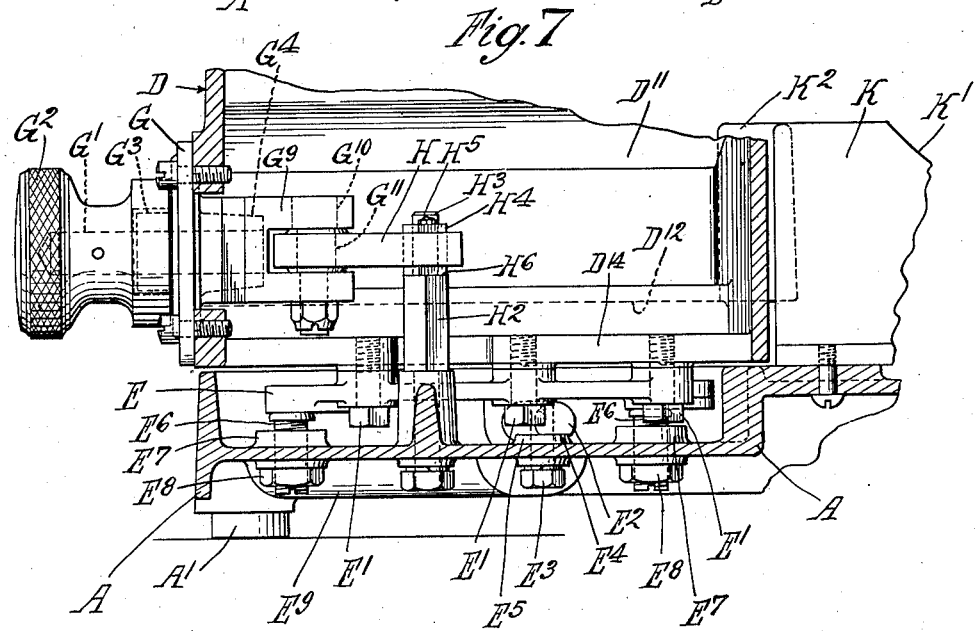

Figure 1 is an end elevation;
Figure 2 is a rear elevation;
Figure 3 is a plan view;
Figure 4 is a section on the line 4—4 of Fig. 1; with the slice receiving tray removed;
Figure 5 is a similar section with the parts in different position;
Figure 6 is a section on the line 6—6 of Fig. 4;
Figure 7 is a section on the line 7—7 of Fig. 6;
Figure 8 is a section on the line 8—8 of Fig. 4;
Figure 9 is a partial view of a gauge plate; and
Figure 10 is a section on the line 10—10 of Fig. 9.

Like parts are indicated by like symbols throughout the specification and drawings.

Referring to the drawings, A generally indicates the slicing machine base which may be supported for example upon the stud members $A^1$ which may be of yielding material. At one end of the frame or base there is an upward housing and frame projection generally indicated as $A^2$. Associated with it may be the motor $A^3$. $A^4$ indicates a hub within which may be positioned any suitable bearing means for the rotary knife B, which may be driven through any suitable transmission by the motor $A^3$. $A^5$ indicates any suitable cover for the frame and bearing section $A^2$.

C indicates a slice receiving tray positioned to the rear of the knife and removably supported upon the base A. It is indicated, as in Figure 2, as extending from adjacent the motor $A^3$ to the opposite edge or end of the base A. $C^1$ indicates an overhanging guide or deflector plate positioned along the motor $A^3$ and extending forwardly to the frame portion $A^2$ and hub portion $A^4$. It is undercut as at $C^2$ in order to overhang the adjacent edge of the tray C. As shown in section in Figure 6, the tray terminates at its outer edge with an upwardly flaring portion $C^3$ and a recurved or overhanging portion or apron $C^4$. It will be seen, as in Figure 6 that this apron $C^4$ overhangs the edge of the base A and thereby limits the forward movement of the tray toward the knife. An interior downward flange $C^5$ may, if desired, be employed in order to prevent unintended rearward movement of the plate. In other words, the plate or tray would have to be lifted in order to permit the member $C^5$ to clear the edge of the base A, before the tray can be rearwardly moved. On the forward side of the tray is a generally upright flange $C^6$ which bends as at $C^7$. The edge of the tray is cut away at the corner as at $C^8$, the edge $C^8$ being generally parallel with the portion $C^7$ of the flange $C^6$.

D generally indicates the gauge plate support which includes an upwardly extending housing $D^1$, on the rear of which projects upwardly the plate $D^2$, to the forward face of which may be secured the gauge plate proper $D^3$. The gauge plate may be secured by the members shown in detail in Figures 6, 9 and 10. $D^4$ generally indicates a cage which may be of sheet metal, which may be electrically welded to the rear of the gauge plate $D^3$, the cage being shown as apertured as at $D^5$, the aperture being of insufficient size to permit the escape of a squared nut $D^6$ somewhat smaller than the interior of the cage $D^4$. $D^7$ indicates the screwthreaded central aperture of the nut. Screws $D^8$ pass through the wall $D^2$ and may be screwed into the nuts $D^6$, the rotation of which is prevented by the size and shape of the cage. However, the cage and its aperture are both large enough to permit the gauge plate to be adjusted more or less when the screws $D^8$ are partially released. The edges of the gauge plate $D^3$ abut against the surrounding flange or rim $D^9$. As will be seen from Figure 9, the nut may be inserted into the cage before the ears $D^{10}$ of the cage are folded into the position in which they are shown in Figure 9. When they are folded into position, then the nut is locked into the cage. The structure $D^1$ is provided with a rear wall $D^{11}$ which is undercut as at $D^{12}$ in order to permit the housing $D^1$ to travel rearwardly over the plate or tray C. Specifically, the overhang $D^{12}$ can pass over the upstanding flange $C^6$, as shown in Figure 6. When the gauge plate is at the forward movement of its adjustment, as shown in Figure 6, the wall $D^{11}$ may be substantially flush with the flange $C^6$, or may slightly overhang it in order to make it difficult for foreign material, bits of meat or the like to penetrate to the space beneath the tray C.

Positioned beneath the tray C, and in the space between the bottom of the tray and the base A, is a base member generally indicated as E, which may be secured to the housing $D^1$ or to the inwardly offset portion $D^{12}$ thereof as by the bolts $E^1$ which may pass through the flange $D^{14}$. This base structure E is slidably mounted upon a fixed rod $E^2$ which is secured at its ends as by the bolts $E^3$ which lock it to the base A. Rotation of the rod may be prevented as by the flat surfaces $E^4$ seating upon upwardly projecting abutments $E^5$. This base plate may be centered, as by the adjustable screwthreaded abutments $E^6$ which project upwardly through the bosses $E^7$ of the base A and may be locked in position as by the nuts $E^8$. Thus the rotary adjustment of the base portion E about the rod $E^2$ may be made, and thereby the gauge plate may be slightly tilted. The bottom of the base may be downwardly recessed as at $E^9$ to give room for the rod $E^2$ and the downwardly depending portion of the plate E. The result is a very low and compact structure. A spring $E^{10}$ may be provided which tends to move the gauge plate structure outwardly away from the cutting plane, or rather, to prevent rattle and to lock the below described adjusting mechanism against unintended movement. The spring may not be necessary, but is desirable in some cases.

In order to actuate the gauge plate, I provide the following mechanism. Mounted at one end of the housing D is a bearing plate G, through which passes the stem or shaft $G^1$ controlled by the manual knob $G^2$. $G^3$ is a collar, pinned on the shaft $G^1$ within the knob structure $G^2$. Positioned at the opposite end of the shaft $G^1$ and abutting against the boss $G^4$ of the plate G is a single turn worm structure $G^5$ which may be slipped over the end of the shaft $G^1$ and is prevented from rotating by the pin $G^6$ on the shaft extending through the slot $G^7$. $G^8$ indicates any suitable nut adapted to lock the worm in position. It will be understood that the worm rotates in unison with and in response to rotation of the exterior manual control knob $G^2$. Integral with the plate G are the inwardly projecting ears $G^9$. Passing through the ears $G^9$ is a pin $G^{10}$, the bearing portion of which $G^{11}$ is eccentric to the head, whereby it may be adjusted toward and away from the worm. Positioned between the ears or lugs $G^9$ and rotatable about the bearing portion $G^{11}$ of the pin $G^{10}$ is an arm H provided with teeth $H^1$ in mesh with the worm $G^8$. Mounted upon the base A is a normally fixed post $H^2$, herein shown as hexagonal. Its end is reduced as at $H^3$ to form a cylindrical pin, upon which is rotatably mounted a square block $H^4$ held against axial movement as by the cotter pin $H^5$ and seated upon the ledge $H^6$. It slidably receives the forked end $H^7$ of the arm H. It will be understood that as the manual control knob $G^2$ is rotated, the worm $G^8$ meshes with the teeth $H^1$. As the outer end of the arm H rotates about a fixed pivot, the inner or toothed end must move, and its movement constrains the entire gauge plate assembly also to move, the knob $G^2$ moving with the assembly. Referring to Figures 4, 5 and 6, it will be therefore seen that a rotation of the knob $G^2$ will move the entire gauge plate assembly to the rear, with the overhang $D^{12}$ slightly clearing the flange $C^6$ of the tray C. The entire gauge plate assembly is supported upon the plate E. It will be seen from Figures 4 and 5 that this plate E travels at an angle defined by the angle of the track or rod $E^2$. This track agrees in inclination with the inclination of the cut away portion $C^8$ of the tray C and also with the angle of the flange $C^7$. Hence, as the gauge plate moves rearwardly at an angle, the connection between the gauge plate structure and the abutting portions of the tray C is obtained and no gaps are permitted through which fragments can pass. Note also that the forward face of the housing $D^1$ projects outwardly as at $D^{20}$. The purpose of this overhang will later be seen in connection with the carriage.

J generally indicates a carriage structure which is supported upon an upper cylindrical track $J^1$ and a lower and generally rectangular guide track $J^2$. $J^3$ indicates a depending portion of the carriage adapted to engage the guide track $J^2$ and to hold the entire carriage structure from rotation about the cylindrical track $J^1$. The portion $D^{20}$ of the housing $D^1$ projects more or less outwardly above this lower track and tends to deflect fragments outwardly above said track.

A forward guard plate K is positioned upon the base A in the general plane of the knife and forwardly of the tray C. It is arcuately formed as at $K^1$ to conform generally to the cutting arc of the knife. It is adapted to fill the gap between the upstanding portion $A^2$ of the frame and the gauge plate structure. I may include a rearwardly extending portion $K^2$ conforming generally to the inclined angle $D^{21}$ of the housing $D^1$, as shown in the upper portion of Figure 4. The portion $K^2$, as well as the portion $D^{21}$, are located in general parallelism with the portions $C^7$ and $C^8$ as shown in Figure 3, the angle conforming to the angle of movement of the gauge plate assembly.

The use and operation of my invention are as follows:

In slicing materials with the mechanism herein described they are placed upon the support J which is manually moved across the face of the gauge plate $D^3$ and past the cutting edge of the knife, the slices being severed by the rotary knife B.

It will be understood that the thickness of the slices may be gauged in response to rotation of the manual control knob $G^2$ which operates through the above described mechanism to move the gauge plate and gauge plate support rearwardly away from the cutting plane of the knife and laterally away from the cutting edge, along an inclined axis defined for example by the rod $E^2$ as shown in Figure 4. The knob $G^2$ is mounted upon and moves with the gauge plate structure. The gauge plate proper, $D^3$, is provided with pockets as shown for example in Figures 9 and 10, which pockets hold the nuts $D^6$ and prevent their rotation. The screws $D^8$ pass through the rear wall $D^2$ of the gauge plate support. The size of the apertures $D^5$ of the pockets is such as to permit a certain adjustment of the gauge plate. For example it may be slightly raised or slightly lowered or moved slightly towards or away from the cutting edge of the knife, or tilted slightly in order to cause its arcuate edge to conform to a cutting edge of the knife. This relationship will be clear from Figure 2.

The slice support C extends to the rear of the gauge plate supporting structure and the opposed parts are so formed as to prevent, at all positions of the gauge plate, any open gap or cavity through which material can pass. Note for example, as shown in Figure 6, the overhang $D^{12}$ which overlies the forward edge C⁶ of the member C at all positions of adjustment of the gauge plate.

I claim:

1. In a slicing machine which includes a base, a knife mounted on said base and means for actuating it, a gauge plate, a work support, and means for guiding said work support across the face of said gauge plate and past the cutting edge of the knife along a path in parallelism with the forward face of the gauge plate, and means for varying the position of the gauge plate, including a gauge plate support, a manual control member mounted thereon and movable therewith and a driving connection adapted, in response to movement of said manual control member, to move the gauge plate support toward or away from the cutting plane, said driving connection including a lever pivoted to said support, a connection between said lever and the base, said lever being rotatable about said connection, and means for rotating said lever in response to movement of said manual control member, and means for permitting longitudinal movement of the lever in relation to its connection with the base, said means including a block rotatable about the axis of connection between the lever and the base, and a sliding connection between said lever and the block.

2. In a slicing machine, a base, a knife mounted on said base and means for actuating it, a slice receiver, a gauge plate, a gauge plate support and means for moving it toward and away from the cutting plane of the knife, guiding means for guiding said gauge plate support to a predetermined path in its movement toward and away from the knife, said guiding means being located entirely beneath the slice receiver, and substantially to the rear of the cutting plane, and a guard member, independent of said guiding means, including a portion lying in the general plane of the knife and conforming generally to the cutting edge of the knife, and an extension for said guard member, integral therewith, and interposed between said guiding means and said knife, extending rearwardly of the cutting plane of the knife, and upstanding from the base, said extension and said gauge plate support including opposed faces adapted to overlap at all positions of adjustment of the support, said faces being at all times closely adjacent but out of bearing contact, and generally parallel with the path to which the gauge plate support is constrained by the guiding means.

WILLIAM J. CAMPBELL.